(12) United States Patent
Motley et al.

(10) Patent No.: US 8,360,404 B2
(45) Date of Patent: Jan. 29, 2013

(54) SHOCK ABSORBING INTERPOSER

(75) Inventors: Charles B. Motley, Stoughton, WI (US); Christopher Martin, Minneapolis, MN (US)

(73) Assignee: FYCM Enterprises, LLC, Minneapolis, MN (US)

( * ) Notice: Subject to any disclaimer, the term of this patent is extended or adjusted under 35 U.S.C. 154(b) by 382 days.

(21) Appl. No.: 12/719,137

(22) Filed: Mar. 8, 2010

(65) Prior Publication Data
US 2010/0224273 A1 Sep. 9, 2010

Related U.S. Application Data

(60) Provisional application No. 61/158,610, filed on Mar. 9, 2009.

(51) Int. Cl.
*F16F 7/00* (2006.01)
*F16F 13/00* (2006.01)
*F16F 15/00* (2006.01)
*B60G 11/22* (2006.01)

(52) U.S. Cl. .................. 267/141.1; 267/140.4; 267/293; 251/64; 251/236

(58) Field of Classification Search .................. 251/64, 251/231, 236, 241, 244–246, 319–321; 74/548; 267/141.1, 140.11, 140, 140.4, 140.13, 293, 267/151, 153, 150, 152, 136, 139, 141, 201, 267/267, 292; 16/2.1–2.5, DIG. 24, DIG. 41, 16/431, 436
See application file for complete search history.

(56) References Cited

U.S. PATENT DOCUMENTS

| 1,857,168 | A | * | 5/1932 | Steiner et al. | 267/140.5 |
|---|---|---|---|---|---|
| 1,920,436 | A | * | 8/1933 | Riker | 267/141.1 |
| 1,975,145 | A | * | 10/1934 | Geyer | 267/140.3 |
| 2,345,840 | A | | 4/1944 | Strong | |
| 2,899,170 | A | | 8/1959 | Cornelius | |
| 3,718,233 | A | | 2/1973 | Nordhoff | |
| 4,226,343 | A | | 10/1980 | Fling | |
| 4,291,821 | A | | 9/1981 | Nezworski | |
| 4,625,213 | A | | 11/1986 | Horn | |
| 5,029,496 | A | | 7/1991 | Catania | |
| 5,280,890 | A | | 1/1994 | Wydra | |
| 5,368,205 | A | | 11/1994 | Groh | |
| 5,573,145 | A | | 11/1996 | Groh | |
| 5,750,905 | A | | 5/1998 | Weimer et al. | |

(Continued)

FOREIGN PATENT DOCUMENTS
GB 2 371 513 7/2002

OTHER PUBLICATIONS

PCT International Search Report; PCT/US2010/026517. PCT Written Opinion of the International Searching Authority; PCT/US2010/026517.

*Primary Examiner* — John K Fristoe, Jr.
*Assistant Examiner* — David Colon Morales
(74) *Attorney, Agent, or Firm* — Leydig, Voit & Mayer, Ltd.

(57) ABSTRACT

A shock absorbing interposer is positionable between a manually manipulatable handle and a faucet of a beverage dispenser for dispensing a beverage. The interposer includes a faucet adapter mechanism for interconnecting to a lever of the faucet and a handle adapter mechanism for interconnecting to the handle. A shock absorbing member is operatively connected to the faucet adapter mechanism and the handle adapter mechanism to dissipate excessive forces applied to the handle as the handle is moved between a first operative position and a second operative position in order to reduce the likelihood that such excessive forces will be exerted on the faucet and handle. A faucet assembly including a faucet, handle and shock absorbing interposer is also provided.

15 Claims, 3 Drawing Sheets

U.S. PATENT DOCUMENTS

| | | |
|---|---|---|
| 6,249,925 B1 | 6/2001 | Ishida et al. |
| 7,641,170 B2 | 1/2010 | Spray et al. |
| 2003/0030201 A1* | 2/2003 | Williams ............... 267/140.13 |
| 2003/0226556 A1* | 12/2003 | Leven ............................. 124/89 |
| 2005/0139619 A1 | 6/2005 | Laninga et al. |
| 2006/0252586 A1 | 11/2006 | Nguyen |
| 2008/0142553 A1 | 6/2008 | Lassen |
| 2008/0197146 A1 | 8/2008 | Eyler |
| 2008/0203113 A1 | 8/2008 | Groh |

* cited by examiner

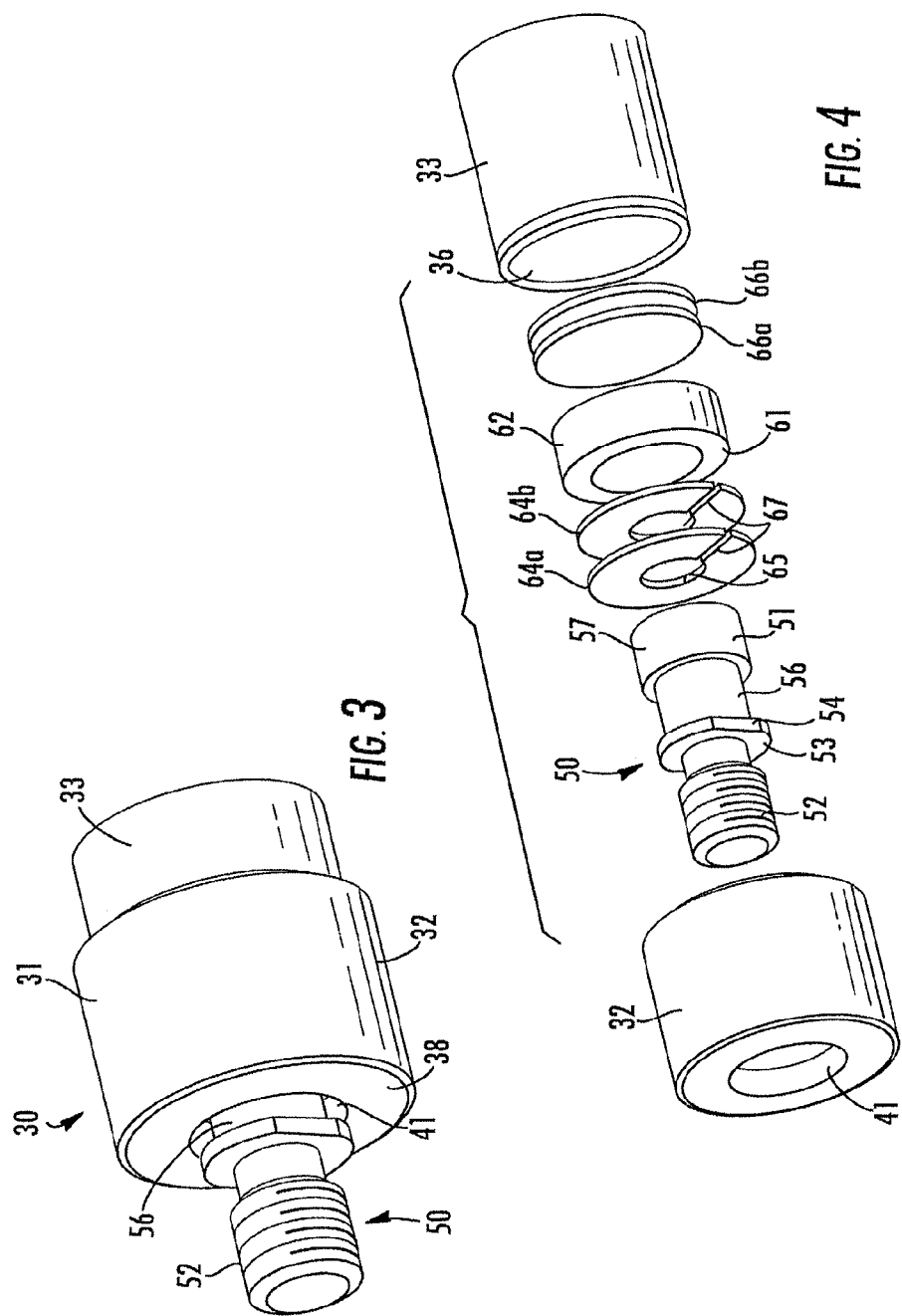

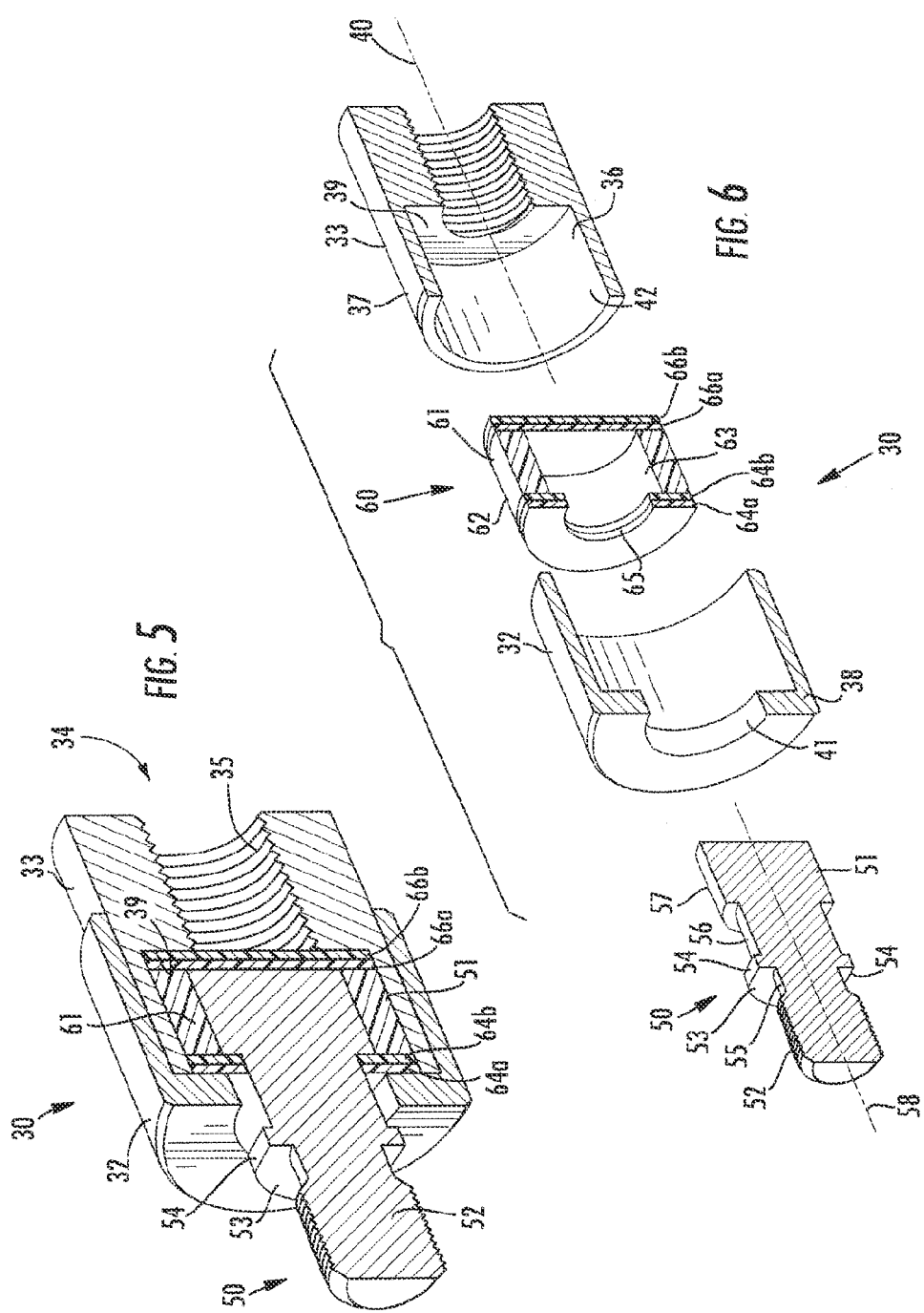

SHOCK ABSORBING INTERPOSER

CROSS-REFERENCE TO RELATED APPLICATION

This patent application claims the benefit of U.S. Provisional Patent Application No. 61/158,610, filed Mar. 9, 2009, which is incorporated by reference.

BACKGROUND OF THE INVENTION

The present invention generally relates to a shock absorbing structure and, more particularly, to a shock absorbing interposer for absorbing stresses in a beverage dispensing system.

In a typical bar or tavern, a system for dispensing beer and certain other beverages includes a number of faucets or taps at which the beer is dispensed, a cooler in which kegs of beer are stored remotely from the faucets and transport systems consisting of a series of conduits or tubes that transport the beer to the faucets. Tap handles are mounted on the faucets to facilitate pouring of the beer.

In order to increase the appeal and distinctiveness of their brand of beer, many brewers of beer manufacture or provide distinctive, ornamental tap handles for use on the faucet in the bar that is dispensing their beer. As opposed to short, primarily functional handles that are approximately six inches long, such ornamental handles that may be as long as twelve inches or more. Inasmuch as a significant focus of the manufacturer is the distinctiveness of the tap handles, the handles may not be designed with strength in mind. In particular, the tap handles typically have a threaded bore at a lower end thereof for interconnecting to a movable lever on the faucet. Due to the space required for the threaded bore, the lower end of the tap handle is especially weak and prone to stress concentrations and breakage.

While the long handles clearly provide a larger area in which to display the distinctiveness of a brewer, the long handles also provide a significant mechanical advantage during actuation of the faucet. During peak serving periods, bartenders are focused on quickly pouring beer and otherwise servicing customers, not on carefully turning the beer taps on and off. The long handles make it extremely easy to provide a relatively large moment or force at the junction between the faucet and tap handle. Such excessive force may cause the handle to crack or break or simply cause the faucet itself to break. In either case, the particular faucet will be out of service until such handle or faucet is replaced. This will result in loss of revenue and customer goodwill during the time period in which the faucet for a particular brand of beer is inoperative.

BRIEF SUMMARY OF THE INVENTION

It is an object to solve the above-described problems encountered within existing beverage dispensing systems by providing a simple, low cost solution to broken handles and faucets. Accordingly, a shock absorbing interposer is provided that is positionable between a manually manipulatable handle and a faucet of a beverage dispenser for dispensing a beverage. The interposer includes a faucet adapter mechanism having a threaded bore for interconnecting to a threaded lever of the faucet and a handle adapter mechanism having a threaded stud for interconnecting to a threaded bore of the handle. A shock absorbing member is operatively connected to the faucet adapter mechanism and the handle adapter mechanism to dissipate excessive forces applied to the handle as the handle is moved between a first operative position at which flow through the faucet is prevented and a second operative position at which flow through the faucet is permitted in order to reduce the likelihood that such excessive forces will be exerted on the faucet and handle.

If desired, axes of the threaded bore of the faucet adapter mechanism and the threaded stud of the handle adapter mechanism may be coincident absent an external force being applied to the handle adapter mechanism. The shock absorbing member may be positioned between the faucet adapter mechanism and the handle adapter mechanism. Both the faucet adapter mechanism and the handle adapter mechanism may be one-piece integrally formed members, and the shock absorbing member may be configured to engage directly both the faucet adapter mechanism and the handle adapter mechanism. A housing may be provided to maintain the shock absorbing member in direct engagement with both the faucet adapter mechanism and the handle adapter mechanism. The shock absorbing member may be chosen from urethane, buna or another material with similar properties and characteristics. The shock absorbing member may have a durometer rating within a range of approximately 55-75 Shore A.

A shock absorbing interposer may be provided for positioning between a manually manipulatable handle and a faucet of a beverage dispenser for dispensing a beverage. Such interposer includes a shaft member having a force dispersion section thereon and a housing member having a receptacle for receiving the force dispersion section of the shaft member therein. The receptacle is dimensioned to permit the force dispersion section to move within the receptacle. One of the shaft member and the receptacle member has a coupling section for interconnecting to the handle and the other has a coupling section for interconnecting to the faucet. A resilient member is positioned between the force dispersion section and the receptacle to dissipate excessive forces applied to the handle in order to reduce the likelihood that such excessive forces will be transmitted to the faucet.

If desired, the force dispersion section may be movable laterally relative to the receptacle axis of the housing and the shaft member may be pivotable relative to the receptacle. The force dispersion section of the shaft member may be axially movable along the receptacle axis. The shaft member has an axis and the shaft member may be rotatable about its own axis.

If desired, the force dispersion section of the shaft member may be axially movable along the receptacle axis. The force dispersion section of the shaft member together with the resilient member may be movable within the receptacle along the receptacle axis. An axial shock absorber may be provided to absorb axial forces along the axis. The axial shock absorber including first and second resilient members within the receptacle that are positioned on opposite sides of the force dispersion section of the shaft member relative to the axis. Further, the first and second resilient members may each include a plurality of disks.

If desired, the shaft member may be positioned along a shaft axis absent an external force being applied to the shaft member. The shaft member, the receptacle and the resilient member may be configured such that an external force no greater than a predetermined magnitude applied to the shaft member will cause the shaft member, the resilient member and the housing to move as an assembly but an external force exceeding the predetermined magnitude applied to the shaft member will cause deformation of the resilient member and permit limited movement of the shaft away from the shaft axis.

A faucet assembly for dispensing a beverage may be provided that includes a faucet body, a handle, and a shock absorbing interposer. The faucet body has an inlet through which the beverage enters the faucet, a spout through which the beverage exits the faucet and a valve member between the inlet and the spout for controlling flow of the beverage through the faucet. The valve member includes a lever movable between a first operative position at which flow through the faucet is prevented and a second operative position at which flow through the faucet is permitted. The manually manipulatable handle assists in moving the lever between the first and second operative positions and the handle has a bore. The shock absorbing interposer includes a faucet adapter mechanism having a bore for interconnecting to the lever of the faucet, a handle adapter mechanism having a stud for interconnecting to the bore of the handle, and a resilient material operatively connected to the faucet adapter mechanism and the handle adapter mechanism to dissipate excessive forces applied to the handle and faucet as the lever reaches the first and second operative positions.

If desired, the resilient material may be positioned between the faucet adapter mechanism and the handle adapter mechanism. Axes of the bore of the faucet adapter mechanism and the stud of the handle adapter mechanism may be coincident absent an external force being applied to the handle adapter mechanism. The handle may have a reduced cross-sectional area generally adjacent the bore.

BRIEF DESCRIPTION OF THE DRAWINGS

Various other objects, features and advantages of the present invention will become more fully appreciated and better understood when considered in conjunction with the accompanying drawings wherein like-reference characters designate the same or similar parts throughout the several views in which:

FIG. 3 is an perspective view of the shock absorbing interposer member of FIG. 1;

FIG. 4 is an exploded perspective view of the shock absorbing interposer member of FIG. 3;

FIG. 5 is a cross-section of the shock absorbing interposer member depicted in FIG. 3 and FIG. 6 is a partially exploded, cross-section of the shock absorbing interposer member depicted in FIG. 4.

DETAILED DESCRIPTION OF PREFERRED EMBODIMENTS

Figures 1, 2:
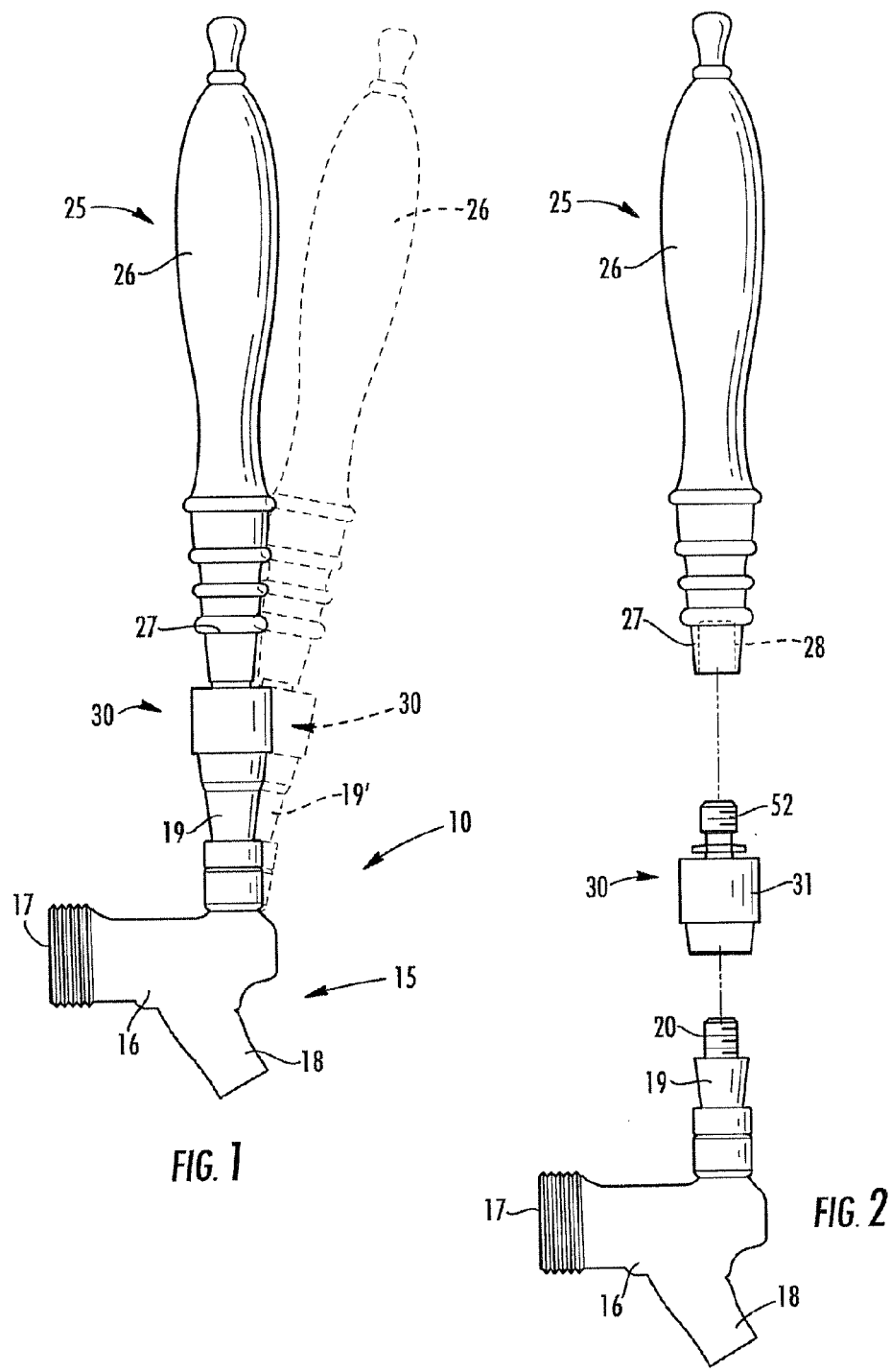
FIG. 1 is a side view of a beverage dispensing faucet assembly including the shock absorbing member in accordance with an embodiment of the invention showing the handle moved between its two operative positions.
FIG. 2 is a partially exploded side view of the beverage dispensing assembly of FIG. 1.

The following description is intended to convey the operation of exemplary embodiments of the invention to those skilled in the art. It will be appreciated that this description is intended to aid the reader, not to limit the invention. As such, references to a feature or aspect of the invention are intended to describe the feature or aspect of the embodiment of the invention, not to imply that every embodiment of the invention must have the described characteristic.

FIGS. 1-2 illustrate a beverage dispensing faucet assembly 10 suitable for mounting in a tavern, bar, restaurant or other similar establishment. The assembly 10 includes faucet 15, handle 25, and shock absorbing interposer 30 positioned therebetween. In this description, representations of direction such as up, down, left, right, front, rear and the like used for explaining the structure and movement of each part of the disclosed embodiment are not absolute, but relative. These representations are appropriate when each part of the disclosed embodiment is in the position shown in the Figures. If the position of the disclosed embodiment changes, these representations are to be changed according to the change in position of the disclosed embodiment.

Faucet 15 includes a faucet body 16 of known type having an inlet 17 through which a liquid or beverage such as beer may enter the faucet body. Spout 18 is provided as an exit port through which the beverage that entered through inlet 17 may pass. Faucet 15 includes an internal valve mechanism (not shown) that is actuated by movement of handle lever 19 between a closed position as depicted in the solid lines in FIG. 1 at which no liquid may pass through faucet 15 and an open position as depicted in phantom at 19' in FIG. 1 at which liquid may freely pass through faucet 15. Handle lever 19 moves back and forth between the first and second operative positions in a plane generally extending through the inlet 17, spout 18, and handle lever 19. Handle lever 19 includes a threaded shaft or stud 20 at a top end thereof.

Handle 25 includes a generally elongated handle portion 26 and an end or mounting section 27 in which a threaded bore 28 is located. Handle 25 is depicted as being generally cylindrical but may be formed in a variety of shapes. While the length and shape of handle 25 may vary considerably, the handle as depicted is relatively long and omni-directional meaning that it may be mounted in any rotational orientation.

Shock absorbing interposer 30 includes an outer housing 31 formed of an end cap 32 and a female end housing 33. A male end member 50 is positioned within outer housing 31 and extends through bore or aperture 35 in end cap 32. A shock absorbing insert or section 60 generally surrounds an end portion or force dispersing section 51 of male end member 50. Female end housing 33 is a generally cylindrical member with a mounting section 34 at one end and a dampening or shock absorbing cylindrical bore or cavity 36 at the opposite end. Mounting section 34 of female end receptacle housing 33 has a threaded cylindrical bore 35 dimensioned so as to inter-mate with the threaded stud 20 of handle lever 19 of faucet 15. Shock absorbing cavity 36 is dimensioned so as to receive shock absorbing section 60 and force dispersion section 51 of male end member 50 therein.

End cap 32 is cylindrically shaped with the substantial length thereof having a diameter dimensioned so as to receive therein the outer surface 37 of female end housing 33 in a press fit manner. End cap 32 includes an end wall 38 with a bore or aperture 41 through which a portion of male end member 50 extends. Bore 41 is dimensioned so that male end member 50 may move or pivot within bore 41 as described below. Female end housing 33 and end cap 41 may be formed of aluminum, stainless steel, delrin, nylon or other non-corrosive metals or polymers with similar strength and corrosion resistance characteristics.

Male end member 50 is a generally elongated shaft with a force dispersion section 51 at one end and a threaded stud or shaft 52 at the opposite end thereof. A flange 53 is provided between force dispersion section 51 and threaded stud 52 and includes a pair of oppositely facing flat tool engaging sections 54 that are provided in case it is desired to use a tool to engage and either secure or rotate shock absorbing interposer 30 or adjust the rotational position of male end member 50. If desired, flat tool engaging sections 54 may be omitted without eliminating the ability to rotate or secure handle 25 as described below. A first undercut member 55 is provided between threaded stud 52 and flange 53. A second, larger undercut section 56 is provided between flange 53 and force dispersion section 51 and is dimensioned so as to be smaller than bore 41 in the end section 38 of end cap 32 to permit movement of undercut section 56 within bore 41. Force dispersion section 51 is generally cylindrical and dimensioned to have a diameter sufficiently smaller than the diameter of shock absorbing cavity 36 so as to permit shock absorbing ring 61 to be positioned therebetween. Male end member 50 may be formed of aluminum, stainless steel, delrin, nylon or other non-corrosive metals or polymers with similar strength and corrosion resistance characteristics.

Shock absorbing insert 60 includes a somewhat rigid shock absorbing ring or cylinder 61 having an outside diameter dimensioned so as to be snugly received within shock absorbing cavity 36 and an inside diameter or surface 63 dimensioned so as to snugly receive the outer surface 57 of force dispersion section 51 of male end member 50. In one embodiment, shock absorbing ring 61 may be made of polyethylene, polyurethane, urethane or other materials of similar properties. Although a durometer or hardness rating for the shock absorbing ring 61 has been initially targeted at approximately 70 Shore A, a durometer rating within a range of approximately 55-75 Shore A is anticipated to provide acceptable performance. A wider range may be possible depending upon the characteristics of the handle and faucet and the desired tactile feel to be experienced by a user.

Shock absorbing ring 61 is sufficiently rigid and extends in the direction of an axis 40 through shock absorbing cavity 36 and bore 35 sufficiently so as to substantially center shock dispersion section 51 of male member 50 along such axis yet still permit some movement of the male end member 50 off of the axis 40 while performing the shock absorbing function. Shock absorbing ring 61, shock dispersion section 51 and shock absorbing cavity 36 are also dimensioned so as to permit male end member 50 to move axially along the axis 40 through shock absorbing cavity 36. In addition, because the male end member 50, shock absorbing ring 61, and shock absorbing ring 61 are press fit together in shock absorbing cavity 36, torsional forces between male end member 50 and female end housing 33 are resisted. However, if the torsional force is great enough, the press fit forces will be overcome and the male end member 50 may rotate relative to female end housing 33.

A male end pair of axial shock absorbing disks or wafers 64a, 64b is positioned at one end or side of shock absorbing ring 61 towards threaded stud 52 of male end member 50. Each male shock absorbing disk 64a, 64b has an inner diameter 65 dimensioned so as to fit around undercut section 56 of male end member 50 and a split or seam 67 in order to facilitate mounting on undercut section 56. A similar pair of female axial shock absorbing disks or wafers 66a, 66b is provided at the opposite end or side of shock absorbing ring 61 adjacent threaded aperture 35 of female end housing 33. The female disks 66a, 66b are similar to male disks 64 but do not necessarily include an aperture 65 or split 67 as is shown in male axial disks 64. The axial disk pairs 64a, 64b, 66a, 66b interact with end wall 38 of end cap 32 and with end wall 39 of female end housing 33 in order to capture force dispersion section 51 of male end member 50 and shock absorbing ring 61, yet still permit some limited axial movement of force dispersion section 51 and shock absorbing ring 61 relative to housing 31. In one embodiment, axial disks 64a, 66a may be made of urethane, buna, spring steel (including cupped washers or wave-springs) or other materials or structure of similar strength and performance characteristics to provide resiliency and axial disks 64b, 66b may be made of nylon or other materials or structure of similar strength and performance characteristics to provide rigidity and protect disks 64a, 66a.

Through such a structure, male end member 50 is securely and accurately positioned within housing 31 and threaded stud 52 is biased to be positioned along axis 40 extending through bore 35 of female end housing 33. A lateral force applied to threaded stud 52 of male end member 50 is generally transmitted through shock absorbing ring 61 and to inner 42 surface of shock absorbing cavity 36 of female end housing 33. However, a force that exceeds a predetermined amount will cause deformation of shock absorbing ring 61 so that only a limited amount of the lateral force will be transferred to the female end housing and ultimately to threaded bore 35.

Similarly, a rotational or torsional force applied to threaded stud 52 via handle 25 will apply a torsional force through shock absorbing ring 61 to female end housing 33 and thus to handle lever 19 via threaded bore 35. However, once a predetermined magnitude of torque is exceeded, slippage will occur between one or more of the press-fit intersections of surface 57 of force dispersion section 51 of male end member 50 with inner surface 63 of shock absorbing ring 61 and/or outer surface 62 of shock absorbing ring 61 with inner surface 42 of shock absorbing cavity 36 of female end housing 33.

Axial forces applied to handle portion 26 are passed through force dispersion section 51 of male end member 50 through axial female disks 66 and into end wall 39 of female end housing 33 or from force dispersion section 51 of male end member 50 through male axial disks 64 and into end wall 38 of end cap 32, depending on the direction from which the axial force is being applied to male end member 50. In either case, a portion of the axial force will be absorbed by the axial disks 64, 66, thus limiting the axial force applied from handle portion 26 through male end member 50 and into faucet 15 via female end housing 33 and handle lever 19.

From the foregoing, it can be seen that male end member 50, and thus handle 25, may move in many different directions relative to female end housing 33, and thus faucet 15, in order to limit the amount of force applied to faucet 15. As a result, excessive force on handle 25 or on faucet 15 is avoided by permitting male end member 50 to move independently of female end housing 33. For example, shock dispersion section 51 of male end member 50 may move laterally relative to the axis 40 of shock absorbing cavity 36 through the compression of shock absorbing ring 61 between shock dispersion section 51 and the inner 42 wall of shock absorbing cavity 36. In other words, male end member is capable of moving such that an axis 58 thereof may move laterally relative to the axis through shock absorbing cavity 36. Furthermore, such deformation of shock absorbing ring 61 will also permit male end member 50 to pivot or tilt within shock absorbing cavity 36 generally about shock dispersion section 51. Male end member 50 may also rotate about its own axis 58 relative to shock absorbing cavity 36 if a sufficient torsional or rotational force is applied to male end member 50. Finally, male end member 50 may also slide or move along or parallel to the axis 40 of the shock absorbing cavity 36. In use, male end member 50 is simultaneously moveable in multiple directions and thus will limit stresses placed on the handle 25 and faucet 15 and protect them from breakage. In addition, as an operator moves handle 25 past its normal range of movement, the movement of male end member 50 relative to outer housing 31 can be felt by an operator and thus will provide tactile feedback or an indication of over-travel of the handle 25 so that the operator will stop pushing or pulling on the handle.

In assembly, female axial disks 66 are inserted into shock absorbing cavity 36 of female end housing 33 and located generally adjacent end wall 39 of the shock absorbing cavity.

Force dispersion section 51 of male end member 50 is press fit into shock absorbing ring 61 and male axial disks 64 are positioned onto undercut section 56 of male end member 50. The subassembly of the male end member 50, shock absorbing ring 61 and male axial disks 64 is then press fit into shock absorbing cavity 36. In order to complete the assembly, end cap 32 is press fit onto female end housing 33 with a length male end member 50 including threaded stud 52, undercut section 55 and flange 53 extending through bore 41.

To mount shock absorbing interposer 30 in beverage dispensing faucet assembly 10, shock absorbing interposer 30 is positioned above faucet 15 such that bore 35 of female end housing 33 and threaded stud 20 of handle lever 19 of faucet 15 are axially aligned. Shock absorbing interposer 30 and faucet 15 are moved relatively together and bore 35 is threaded onto stud 20 to secure interposer 30 to faucet 15. Bore 28 of handle 25 and threaded stud 52 of male end member 50 are then axially aligned. Handle 25 is moved towards stud 52 and rotated until the handle is secured.

Although the rotational orientation of handle 25 depicted in FIGS. 1-2 is not a concern as the handle 25 is omnidirectional, some handles are configured to be mounted in a single angular orientation. Through the structure of the shock absorbing interposer depicted herein, male end member 50, and thus handle 25, may be easily rotated relative to female end housing 33, and thus faucet 15, if a predetermined amount of torque is exceeded. By applying enough torque to handle 25 (either by utilizing a wrench or other tool applied to the flat tool engaging sections 54 of flange 53 of male member 50 or, if tool engaging sections 54 are omitted, by engaging the male member 50 with another appropriate tool such as some type of pliers or by manually manipulating handle 25), handle 25 may be rotated in order to properly angularly align the handle a simple manner.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. For example, a resilient or shock absorbing structure could be positioned between a threaded stud that fits into the threaded bore 28 of handle 25 and a threaded bore that receives stud 20 of handle lever 19 such as, for example, a large coil spring or a resilient polymer member. In addition, other manners of securing the top handle to the shock absorbing interposer such as with a glue or adhesive could be utilized as well as other manners of securing the shock absorbing interposer to the faucet. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A shock absorbing interposer for positioning between a manually manipulatable handle having a threaded handle bore and a faucet of a beverage dispenser for dispensing a beverage, the faucet having a threaded faucet stud, comprising:
    a faucet adapter mechanism having a threaded bore for interconnecting to the threaded faucet stud of the faucet;
    a handle adapter mechanism having a threaded stud for interconnecting to the threaded handle bore of the handle;
    a shock absorbing member operatively connected to the faucet adapter mechanism and the handle adapter mechanism to dissipate forces applied to the handle as the handle is moved between a first operative position at which flow through the faucet is prevented and a second operative position at which flow through the faucet is permitted; and
    the faucet adapter mechanism being rotatable relatives to the handle adapter mechanism.

2. The shock absorbing interposer of claim 1 wherein the threaded bore of the faucet adapter mechanism and the threaded stud of the handle adapter mechanism each define an axis and such axes are coincident absent an external force being applied to the handle adapter mechanism.

3. The shock absorbing interposer of claim 1 wherein the shock absorbing member is positioned between the faucet adapter mechanism and the handle adapter mechanism.

4. The shock absorbing interposer of claim 1 wherein the shock absorbing member has a durometer rating of approximately 70 Shore A.

5. The shock absorbing interposer of claim 1 wherein the shock absorbing member has a durometer rating of approximately 55-75 Shore A.

6. The shock absorbing interposer of claim 1 wherein both the faucet adapter mechanism and the handle adapter mechanism are one-piece integrally formed members, and the shock absorbing member is configured to engage directly both the faucet adapter mechanism and the handle adapter mechanism.

7. The shock absorbing interposer of claim 6 further including a housing to maintain the shock absorbing member in direct engagement with both the faucet adapter mechanism and the handle adapter mechanism, the shock absorbing member being rotatable relative to the housing.

8. A shock absorbing interposer for positioning between a manually manipulatable handle and a faucet of a beverage dispenser for dispensing a beverage, comprising:
    a shaft member having a force dispersion section thereon;
    a housing member having a receptacle for receiving the force dispersion section of the shaft member therein, the receptacle being dimensioned to permit the force dispersion section to move within the receptacle;

one of said shaft member and said receptacle member having a first section for interconnecting to said handle;

another of said shaft member and said receptacle member having a second section for operatively connecting to said faucet; and a resilient member engaging the force dispersion section of the shaft member and being positioned between the force dispersion section and the receptacle to dissipate forces applied to the handle, the shaft member having an axis and being rotatable about its axis relative to the housing member.

9. The shock absorbing interposer of claim 8 wherein said shaft member is positioned along a receptacle axis absent an external force being applied to the shaft member, and the shaft member, the receptacle and the resilient member are configured such that an external force no greater than a predetermined magnitude applied to the shaft member will cause the shaft member, the resilient member and the housing member to move as an assembly but an external force exceeding the predetermined magnitude applied to said shaft member will cause deformation of the resilient member and permit limited movement of said shaft member away from said receptacle axis.

10. The shock absorbing interposer of claim 8 wherein the housing has a receptacle axis and the force dispersion section is movable laterally relative to the receptacle axis and said shaft member is pivotable relative to said receptacle.

11. The shock absorbing interposer of claim 10 wherein said force dispersion section of said shaft member is axially movable along said receptacle axis.

12. The shock absorbing interposer of claim 8 wherein the housing has a receptacle axis and said force dispersion section of said shaft member is axially movable along said receptacle axis.

13. The shock absorbing interposer of claim 12 wherein said force dispersion section of the shaft member together with the resilient member are movable within the receptacle along the receptacle axis.

14. The shock absorbing interposer of claim 13 further including an axial shock absorber to absorb axial forces along said axis, said axial shock absorber including first and second axial shock absorber resilient members within said receptacle, said first and second axial shock absorber resilient members being positioned on respective opposite sides of said force dispersion section of said shaft member relative to said axis.

15. The shock absorbing interposer of claim 14 wherein said first and second axial shock absorber resilient members each include a resilient disk and a rigid disk.

* * * * *